(12) United States Patent
Lu

(10) Patent No.: US 10,312,847 B2
(45) Date of Patent: Jun. 4, 2019

(54) MOTOR CONTROL USING PHASE CURRENT AND PHASE VOLTAGE

(71) Applicant: ALLEGRO MICROSYSTEMS, LLC, Manchester, NH (US)

(72) Inventor: Yisong Lu, Shrewsburg, MA (US)

(73) Assignee: ALLEGRO MICROSYSTEMS, LLC, Manchester, NH (US)

(*) Notice: Subject to any disclaimer, the term of this patent is extended or adjusted under 35 U.S.C. 154(b) by 0 days.

(21) Appl. No.: 15/149,448

(22) Filed: May 9, 2016

(65) Prior Publication Data

US 2017/0324364 A1 Nov. 9, 2017

(51) Int. Cl.
*H02P 21/04* (2006.01)
*G01R 31/34* (2006.01)
*G11B 19/20* (2006.01)
*H02P 27/08* (2006.01)
*H02P 6/18* (2016.01)

(52) U.S. Cl.
CPC ................ *H02P 27/08* (2013.01); *H02P 6/18* (2013.01)

(58) Field of Classification Search
CPC .... H02P 21/04; G01R 31/343; G11B 19/2054
USPC ...................................... 318/400.14
See application file for complete search history.

(56) References Cited

U.S. PATENT DOCUMENTS

| | | |
|---|---|---|
| 4,223,261 A | 9/1980 | White |
| 4,494,052 A | 1/1985 | Kelleher et al. |
| 4,661,756 A | 4/1987 | Murphy et al. |
| 5,627,447 A | 5/1997 | Unsworth et al. |
| 5,811,949 A | 9/1998 | Garces |
| 5,811,954 A | 9/1998 | Randall |
| 5,814,965 A | 9/1998 | Randall |
| 5,923,141 A | 7/1999 | McHugh |
| 6,163,120 A | 12/2000 | Menegoli |
| 6,198,256 B1 | 3/2001 | Miyazaki et al. |
| 6,218,795 B1 | 4/2001 | Syukuri |
| 7,085,484 B2 | 8/2006 | Hara |
| 7,365,765 B2 | 4/2008 | Dan |
| 7,397,883 B2 | 7/2008 | Hattori |
| 7,509,032 B2 | 3/2009 | Jami |
| 7,541,760 B2 | 6/2009 | Lin et al. |

(Continued)

FOREIGN PATENT DOCUMENTS

| | | |
|---|---|---|
| CN | 1190282 A | 8/1998 |
| DE | 195 46 145 A1 | 6/1996 |

(Continued)

OTHER PUBLICATIONS

Instruction Letter regarding amended claims to Foreign Associate dated Feb. 21, 2017 for CN Pat. Appl. No. 201380056237.5; 3 pages.

(Continued)

*Primary Examiner* — Eduardo Colon Santana
*Assistant Examiner* — Cortez M Cook
(74) *Attorney, Agent, or Firm* — Daly, Crowley, Mofford & Durkee, LLP

(57) ABSTRACT

Methods and apparatus to control a three-phase BLDC motor using phase current and phase voltage at zero current detection and a driving current derived from a bus current, for example. The driving current can be combined with a difference angle with an output provided to a controller to control a speed of the motor.

19 Claims, 7 Drawing Sheets

(56) References Cited

U.S. PATENT DOCUMENTS

| | | | |
|---|---|---|---|
| 7,590,334 B2 | 9/2009 | Yabusaki et al. | |
| 7,747,146 B2 | 6/2010 | Milano et al. | |
| 8,089,192 B2 | 1/2012 | Li et al. | |
| 8,259,150 B2 | 9/2012 | Kubo | |
| 8,638,053 B2 | 1/2014 | Ng | |
| 8,729,841 B2 | 5/2014 | Reynolds et al. | |
| 8,742,713 B2 | 6/2014 | Ng | |
| 8,917,043 B2 | 12/2014 | Reynolds et al. | |
| 8,917,044 B2 | 12/2014 | Reynolds et al. | |
| 9,172,320 B2 | 10/2015 | Reynolds et al. | |
| 9,281,769 B2 | 3/2016 | Reynolds et al. | |
| 2002/0113569 A1* | 8/2002 | Iijima | H02P 6/183 318/727 |
| 2004/0075407 A1 | 4/2004 | Ohiwa et al. | |
| 2006/0055352 A1 | 3/2006 | Mori et al. | |
| 2007/0018599 A1 | 1/2007 | Yamamoto et al. | |
| 2008/0100243 A1* | 5/2008 | Kurosawa | G11B 19/2054 318/430 |
| 2008/0201041 A1* | 8/2008 | Jiang | H02P 21/04 701/42 |
| 2010/0027705 A1 | 2/2010 | Neubauer et al. | |
| 2011/0074327 A1* | 3/2011 | Paintz | H02P 25/03 318/400.35 |
| 2012/0007529 A1 | 1/2012 | Kim et al. | |
| 2012/0293098 A1 | 11/2012 | Rote et al. | |
| 2013/0009578 A1 | 1/2013 | Reynolds et al. | |
| 2013/0328517 A1 | 12/2013 | Gerdes et al. | |
| 2014/0084836 A1* | 3/2014 | Pham | G01R 31/343 318/490 |
| 2014/0340008 A1 | 11/2014 | Reynolds et al. | |

FOREIGN PATENT DOCUMENTS

| | | |
|---|---|---|
| DE | 20 2015 106 798 | 1/2016 |
| EP | 0 251 785 A2 | 1/1988 |
| EP | 0 420 501 A1 | 4/1991 |
| EP | 1965490 A2 | 3/2008 |
| EP | 1 965 490 A2 | 9/2008 |
| EP | 1965490 | 9/2008 |
| EP | 2 280 476 A1 | 2/2011 |
| JP | H 56-064209 | 6/1981 |
| JP | 2000-224890 A | 8/2000 |
| JP | 2000-224890 A | 11/2000 |
| JP | 2005-110471 | 4/2005 |
| JP | 2006-058364 | 3/2006 |
| JP | 2006-287990 | 10/2006 |
| JP | 2009-124864 | 6/2009 |
| JP | 4629938 B2 | 2/2011 |
| JP | 2011-109866 | 6/2011 |
| TW | 201110531 A1 | 3/2011 |
| TW | 201429149 A | 7/2014 |
| WO | WO 01/20822 A1 | 3/2011 |

OTHER PUBLICATIONS

Amended Claims to Foreign Associate regarding instruction letter dated Feb. 21, 2017 for CN Pat. Appl. No. 201380056237.5; 20 pages.
Letter from Japanese Associate indicating allowance report dated Oct. 5, 2016 and enclosing allowed claims in English for Japanese Application No. 2014-537070; 7 pages.
"A4920 3-Phase Controller;" Allegro Microsystems, Inc. Concept Data Sheet; Jul. 8, 2011; 12 Pages.
U.S. Notice of Allowance dated Sep. 16, 2013 for U.S. Appl. No. 13/278,458; 16 pages.
PCT International Search Report and Written Opinion dated Jul. 18, 2013 for PCT Application No. PCT/US2012/055422; 8 Pages.
PCT International Preliminary Report dated May 1, 2014 for PCT Application No. PCT/US2012/055422; 6 pages.
Japanese Office Action (with English Translation) dated Feb. 19, 2016 for Japanese Application No. 2015-517249; 7 Pages.
Response (with English Reporting Letter) to Japanese Office Action dated Feb. 19, 2016 for Japanese Application No. 2015-517249; Response filed on May 11, 2016; 11 Pages.
U.S. Office Action dated Sep. 20, 2013 for U.S. Appl. No. 13/278,461; 13 Pages.
Response to U.S. Office Action dated Sep. 20, 2013 for U.S. Appl. No. 13/278,461; Response filed Dec. 10, 2013; 11 Pages.
U.S. Notice of Allowance dated Aug. 22, 2014 for U.S. Appl. No. 13/599,225; 16 Pages.
Toshiba Preliminary Data Sheet; "TB9060FN Toshiba CMOS Digital Integrated Circuit, Silicon Monolithic;" www.datasheetcatalog. com; Sep. 11, 2002; 21 Pages.
PCT International Search Report and Written Opinion dated Feb. 11, 2015 for International Application No. PCT/US2013/054639; 10 Pages.
PCT International Preliminary Report dated Mar. 12, 2015 for International Application No. PCT/US2013/054639; 7 Pages.
Taiwan Office Action and Search Report (with English Translation) dated Oct. 15, 2014 for Taiwan Application No. 102130028; 14 Pages.
Response (with English Reporting Letter and Amended Spec and Claims) to Taiwan Office Action and Search Report dated Oct. 15, 2014 for Taiwan Application No. 102130028; Response filed on Jan. 19, 2015; 23 Pages.
U.S. Notice of Allowance dated Aug. 26, 2014 for U.S. Appl. No. 13/599,234; 16 Pages.
Chinese Patent Office First Office Action dated Nov. 2, 2016 regarding CN Patent Application No. 201380056237.5; 12 pages.
JP Notice of Reasons for Rejection dispatch dated Jun. 27, 2017 for JP Pat. Appl. No. 2015-529838; 3 pages.
Machine Translation of Reference 1 for JP Pat. Appl. No. 2015-529838; 15 pages.
Claims now on file for Office Action with dispatch dated Jun. 27, 2017 for JP Pat. Appl. No. 2015-529838; 9 pages.
Chinese Office Action dated Jul. 4, 2017 for CN Pat. Appl. No. 201380056237.5; 9 pages.
PCT Search Report and Written Opinion dated Aug. 8, 2017 for PCT Application No. PCT/US2017/029246; 12 pages.
Letter from Yuasa and Hara dated Aug. 28, 2017 regarding amended claims filed Aug. 18, 2017 for JP Pat. Appl. No. 2015-529838; 1 page.
Amended Claims now on filed on Aug. 18, 2017 for JP Pat. Appl. No. 2015-529838; 9 pages.
Response to Second Office Action filed on Sep. 8, 2017 for CN Pat. Appl. No. 201380056237.5; 2 pages.
Claims filed in Response to Second Office Action filed on Sep. 8, 2017 for CN Pat. Appl. No. 201380056237.5; 12 pages.
Instruction Letter to NTD Patent & Trade Mark Agency Ltd. Dated Sep. 7, 2017; 2 pages.
English Translated Notice of Reasons for Rejection dispatch dated Feb. 1, 2018 for JP Pat. Appl. No. 2015-529838; 16 pages.
Claims now on file for Office Action dispatch dated Feb. 1, 2018 for JP Pat. Appl. No. 2015-529838; 9 pages.
Response (with English Translation) to Taiwan Office Action dated Jan. 3, 2018 for Japanese Application No. 106114525; Response filed Mar. 14, 2018; 30 Pages.
DCMD Instruction Letter dated Apr. 20, 2018 for JP Pat. Appl. No. 2015-529838; 2 pages.
DCMD Proposed Claims Amendments dated Apr. 20, 2018 for JP Pat. Appl. No. 2015-529838; 12 pages.
Yuasa and Hare response letter dated May 11, 2018 for JP Pat. Appl. No. 2015-529838; 1 page.
Claims now on File filed on Apr. 26, 2018 for JP Pat. Appl. No. 2015-529838; 9 pages.
Taiwanese Allowance Decision dated Jun. 12, 2018 for Taiwanese Application No. 106114525; 3 pages.
Notice to Submit a Response dated Apr. 18, 2018 for KR Pat. Appl. No. 10-2014-7013255; 4 pages.
Proposed Amendment dated Jul. 4, 2018 for KR Pat. Appl. No. 10-2014-7013255; 8 pages.
Taiwan Office Action and Search Report (with English Translation) dated Jan. 3, 2018 corresponding to Taiwan Appl. No. 106114525; 29 Pages.

(56) References Cited

OTHER PUBLICATIONS

International Preliminary Report on Patentability dated Nov. 22, 2018 for International Application No. PCT/US2017/029246; 8 Pages.
Letter from Foreign Associate reporting Allowance Report dated Oct. 1, 2018 for Japanese Application No. 2015-529838; 1 Page.
English Translations of Allowed Claims dated Oct. 1, 2018 for Japanese Application No. 2015-529838; 9 Pages.
Communication pursuant to Rules 161(1) and 162 EPC dated Dec. 7, 2018 for European Application No. 17722265.0; 3 Pages.
21$^{st}$ Century Letter dated Jan. 15, 2019 regarding Notice to Submit a Response for KR Pat. Appl. No. 10-2014-7013255: 3 pages.
Notice to Submit a Response dated Dec. 28, 2018 for KR Pat. Appl. No. 10-2014-7013255; 2 pages.
21$^{st}$ Century Proposed Amendments dated Jan. 15, 2019 for KR Pat. Appl. No. 10-2014-7013255; 6 pages.
DCMD instruction Letter dated Jan. 15, 2019 for KR Pat. Appl. No. 10-2014-7013255; 1 page.
21$^{st}$ Century Letter dated Jan. 16, 2019 regarding Dec. 28, 2018 Office Action for KR Pat. Appl. No. 10-2014-7013255; 1 page.

\* cited by examiner

MOTOR CONTROL USING PHASE CURRENT AND PHASE VOLTAGE

BACKGROUND

As in known in art, brushless DC (BLDC) motors can include an external electronic switch synchronized to the rotor position that replaces a mechanical commutator. In conventional BLDCs, Hall effect sensors may be mounted on the windings for rotor position sensing and closed-loop control of the electronic commutator.

Field Oriented Control (FOC) is a conventional technique for sensor-less and windowless control in BLDC systems. Known FOC processing may require the real-time amplitude of the phase current in at least two phases and complex computations, such as so-called d-q transforming computations. Typical FOC implementations require a current sensing circuit, such as a phase shunt resistor, bus shunt resistor, or dedicated current sensor, an ADC, and a processor to perform FOC plus so-called position observer processing.

SUMMARY

The present invention provides method and apparatus for controlling BLDC motors using zero current (phase) detection (ZCD). In embodiments, a three-phase BLDC motor can be controlled in sinusoidal modes. Phase current direction may be detected using ZCD by using phase current and phase voltage by capturing a voltage driving angle when zero current is detected in accordance with example embodiments. In some embodiments, current distortion may be reduced as compared with conventional window opening sensor-less BLDC systems so as to reduce acoustic noise. In addition, embodiments of the invention may have a current control loop that provides a flexible dynamic response. In embodiments, real-time phase current information may not be needed for motor control. In addition, conventional d-q transforming computations may not be needed.

In one aspect of the invention, a method of controlling a three-phase BLDC motor comprises: receiving a phase current direction for the BLDC motor; determining a first angular difference between a phase current and a phase voltage of the BLDC motor from a voltage driving angle corresponding to zero current detection for the phase current, wherein the driving angle corresponds to a range of zero to three-hundred sixty degrees; determining a second angular difference between an advance angle and the first angular difference; determining a driving current derived from at least one phase current of the BLDC motor; combining the second angular difference and the driving current to generate an output; and feeding the output to a control loop for controlling speed of the BLDC motor.

The method can further include one or more of following features: employing a proportional-integral-derivative (PID) controller as part of the control loop, the voltage driving angle corresponds to a position relative to a rotor magnet having a north N pole and a south S pole, the voltage driving angle corresponds to an input of a sinusoidal function of the phase voltage, the advance angle is provided as an input signal, determining the driving current from an average bus current, the driving current is proportional to a bus current divided by an amplitude command, employing a proportional-integral-derivative (PID) controller as part of the control loop and using an output of the PID controller as a lookup to adjust motor speed, and/or combining the lookup, an amplitude command, and a voltage to control motor speed.

In another aspect of the invention, a system to control a three-phase BLDC motor comprises: a first module to receive a phase current direction for the BLDC motor; a second module to determine a first angular difference between a phase current and a phase voltage of the BLDC motor from a voltage driving angle corresponding to zero current detection for the phase current, wherein the driving angle corresponds to a range of zero to three-hundred sixty degrees; a third module to determine a second angular difference between an advance angle and the first angular difference; a fourth module to determine a driving current derived from at least one phase current of the BLDC motor; a combiner to combine the second angular difference and the driving current to generate an output; and a control loop module having a computer processor to receive the output of the combiner for controlling speed of the BLDC motor.

The system can further include one or more of the following features: the system comprises an IC package having first, second, and third outputs for proving outputs to each of the three phases, the control loop module comprises a proportional-integral-derivative (PID) controller, the voltage driving angle corresponds to a position relative to a rotor magnet having a north N pole and a south S pole, the advance angle is provided as an input signal, a bus current module configured to determine the driving current from an average bus current, the driving current is proportional to a bus current divided by an amplitude command, first, second, and third pairs of switching elements for generating the outputs to each of the three phases of the motor, a gate driver module to receive pulse-width modulated (PWM) signals and generate the outputs to each of the three phases of the motor, and/or the system comprises an IC package having first, second, and third pins for providing outputs to each of the three phases and a fourth pin to receive a speed demand signal.

BRIEF DESCRIPTION OF THE DRAWINGS

The foregoing features of this invention, as well as the invention itself, may be more fully understood from the following description of the drawings in which.

DETAILED DESCRIPTION

Figure 1:
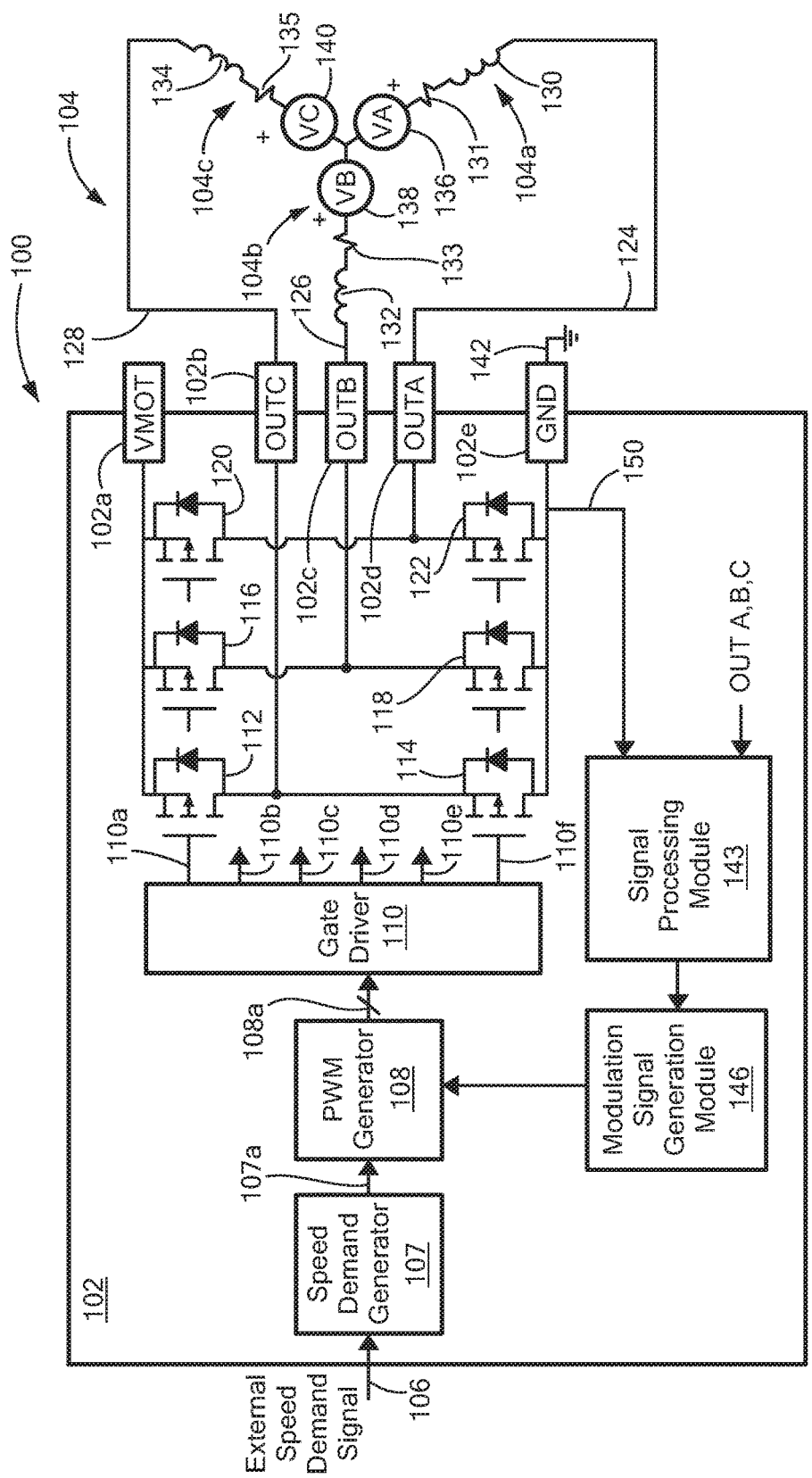
FIG. 1 is a schematic representation of an example control system for a three-phase BLDC motor in accordance with example embodiments of the invention.

FIG. 1 shows an example system 100 for controlling a motor using phase current and phase voltage in accordance with illustrative embodiments of the invention. The control system 100 may be useful for controlling three-phase BLDCs, for example. An exemplary motor control circuit 102 is coupled to drive an electric motor 104, which has three windings 104a, 104b, 104c, that can each be depicted as a respective equivalent circuit having an inductor in series with a resistor and in series with a back EMF voltage source. For example, the winding A 104a is shown to include an inductor 130 in series with a resistor 131 and in series with a back EMF voltage source VA 136. The voltage of the back EMF voltage source VA 136 is not directly observable when a current is flowing in an associated motor winding, but it can be estimated by looking at the phase current and phase voltage.

In general, the voltage across a motor winding, for example, across the winding A 140a, is governed by the following equation:

$$VoutA - Vcommon = VA + IR + LdI/dt,$$

where:
VoutA=observable voltage at one end of the winding A;
Vcommon=(VoutA+VoutB+VoutC)/3 voltage at junction of the windings 104a, 104b, 104c; and can be calculated by VoutA, VoutB and VoutC.
R=resistance of the resistor 131;
L=inductance of inductor 130;
I=current through winding; and
VA=back EMF voltage Thus, it can be seen that, if the current through the winding 104a is zero, then VoutA−Vcommon=VA+LdI/dt. The ideal case is VoutA−Vcommon=LdI/dt, so that the back-EMF VA is in phase with the phase current.

In the illustrated embodiment, the motor control circuit 102 includes a speed demand generator 107 coupled to receive an external speed demand signal 106 from outside of the motor control circuit 102. The external speed demand signal 106 can be provided in a variety of formats. In general, the external speed demand signal 106 is indicative of a speed of the motor 104 that is requested from outside of the motor control circuit 102.

In embodiments, the speed demand signal 107a is determined not only by the external speed demand signal, but also the motor current requirement measured or calculated in signal processing module. If the event of over current limit (OCL) happens, the speed demand signal 107a will be clamped and might be less than the external speed demand signal 106.

The speed demand generator 107 is configured to generate a speed demand signal 107a. A pulse width modulation (PWM) generator 108 is coupled to receive the speed demand signal 107a and configured to generate PWM signals 108a, a duty cycle of which is controlled by the speed demand signal 107a. The PWM generator 108 is also coupled to receive modulation waveforms from a modulation signal generation module 146. The PWM signals 108a are generated with a modulation characteristic (i.e., a relative time-varying duty cycle) in accordance with the modulation waveforms from the modulation signal generation module 146.

In one embodiment, the motor control circuit 102 also includes a gate driver circuit 110 coupled to receive the PWM signals 108a and configured to generate PWM gate drive signals 110a, 110b, 110c, 110d, 110e, 110f to drive six transistors 112, 114, 116, 118, 120, 122 arranged as three half-bridge circuits 112/114, 116/118, 120/122. The six transistors 112, 114, 116, 118, 120, 122 may operate in saturation to provide three motor drive signals VoutA, VoutB, VoutC, 124, 126, 128, respectively, at nodes 102d, 102c, 102b, respectively.

It is understood that any practical number of switching elements coupled in various suitable configurations can be used to meet the needs of a particular application. It is further understood that any suitable signal generator can be used to generate control signals for the switching elements that provide signals to energize the three-phase BLDC motor.

The motor control circuit 102 can also include a signal processing module 143 to receive a bus current measurement signal 150 and one or more of the motor drive signals VoutA, VoutB, VoutC, 124, 126, 128, respectively. In embodiments, these signal can be used for phase A, B, and/or C phase zero current detection (ZCD). The bus current 150 and motor drive signals VoutA,B,C can be used to control motor speed, as discussed more fully below.

The control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

Figure 2:
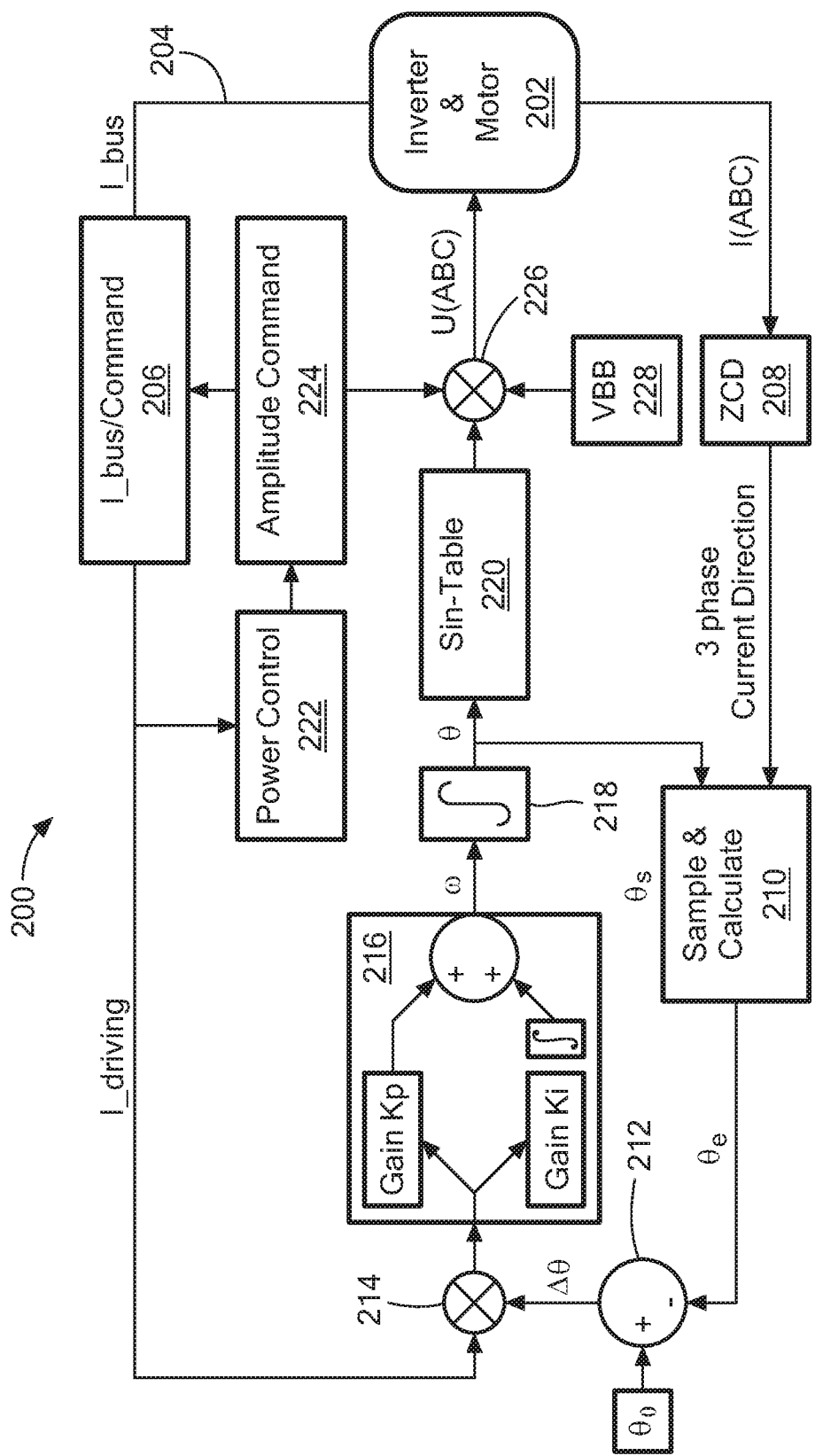
FIG. 2 is a schematic representation showing further detail of the example control system of FIG. 1.

FIG. 2 shows a BLDC control system 200 in accordance with example embodiments of the invention showing further detail for the system of FIG. 1. An inverter/motor module 202 receives control signals U(ABC) to control the three-phase motor. The inverter/motor module 202 generates an I_bus signal 204 corresponding to bus current to an I_bus command module 206 and phase current signals I(ABC) to a zero current detection module 208, which provides three-phase current direction information to a sample/calculate module 210. The I_bus/command (e.g., I_bus divided by speed command) module 206 generates an I_driving signal or driving current, as described more fully below.

The sample/calculate module 210 receives a motor driving angle signal θ, which can be sampled as θs when zero current is detected, and outputs difference angle θe, which corresponds to the difference between the motor phase current and phase voltage, as described more fully below. A phase advance angle θ0, which can be provided as an input signal, can be input to a summer 212, which outputs a difference angle Δθ for adjusting the speed ω of the motor. In an embodiment, the difference angle Δθ and an I_driving signal (driving current) generated by the I_bus/command module 206 are provided as inputs to a combiner 214, e.g., a multiplier, the output of which is provided to a proportional-integral-derivative (PID) controller 216. The PID 216 generates an output value ω for motor speed as the difference between the θe and θ0 attempts to minimize the motor speed error over time. The PID 216 output is integrated 218 and provided to a conversion mechanism 220, e.g., a look-up table, for controlling the motor, as well as to the sample/calculator module 210 to enable sampling θs of motor speed angle signal θ.

It is understood that Kp and Ki represent coefficients for the proportional and integral derivative terms. A derivative coefficient Kd can also be used. P accounts for present values of the error between θe and θ0, I accounts for past values of the error, and D accounts for possible future values of the error, based on a current rate of change. By tuning the coefficients, the PID controller 216 can perform in accordance with specific process requirements The I_bus command module 206 I_driving output signal is provided to a power control module 222, which provides an output to an amplitude command module 224. A combiner 226 receives an output from the amplitude command module 224, the conversion mechanism 220, and a signal 228, such as VBB which can correspond to the motor voltage VM. The combiner 226 output is provided to the inverter/motor module 202 to generate gate signals for the switching elements and thereby control the speed of the motor. In example embodiments, the combiner 226 multiples input signals to generate the output.

Figure 2A:
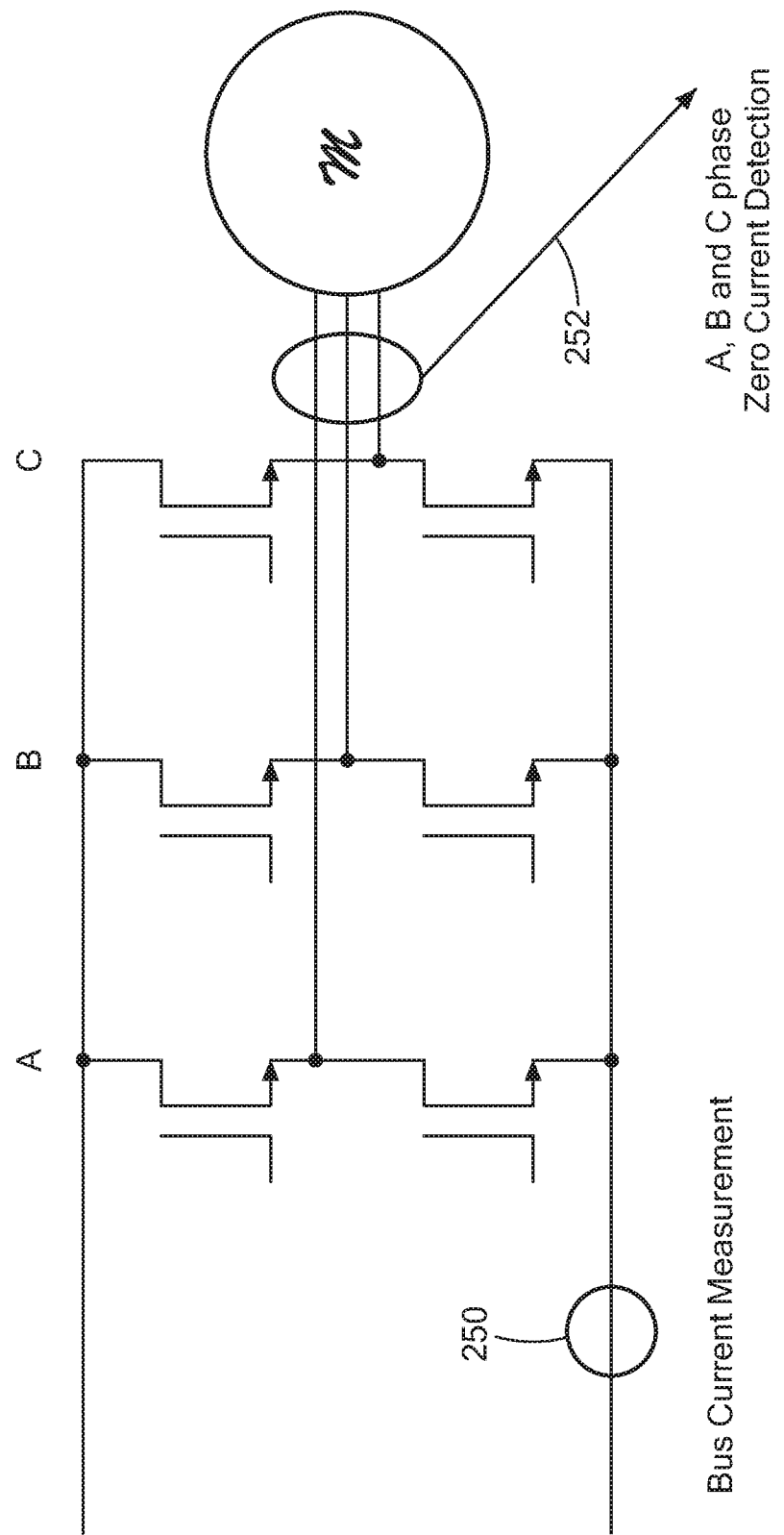
FIG. 2A is a schematic representation showing example bus current measurement and phase zero current detection.

FIG. 2A shows one embodiment of illustrative locations to measure the bus current 250 and phase A, B, C zero current detection 252. In embodiments, first, second, and third switching device pairs are each coupled to a respective phase A, B, C of the motor M. The sensed signals enable phase A, B, C zero current detection.

Figure 3:
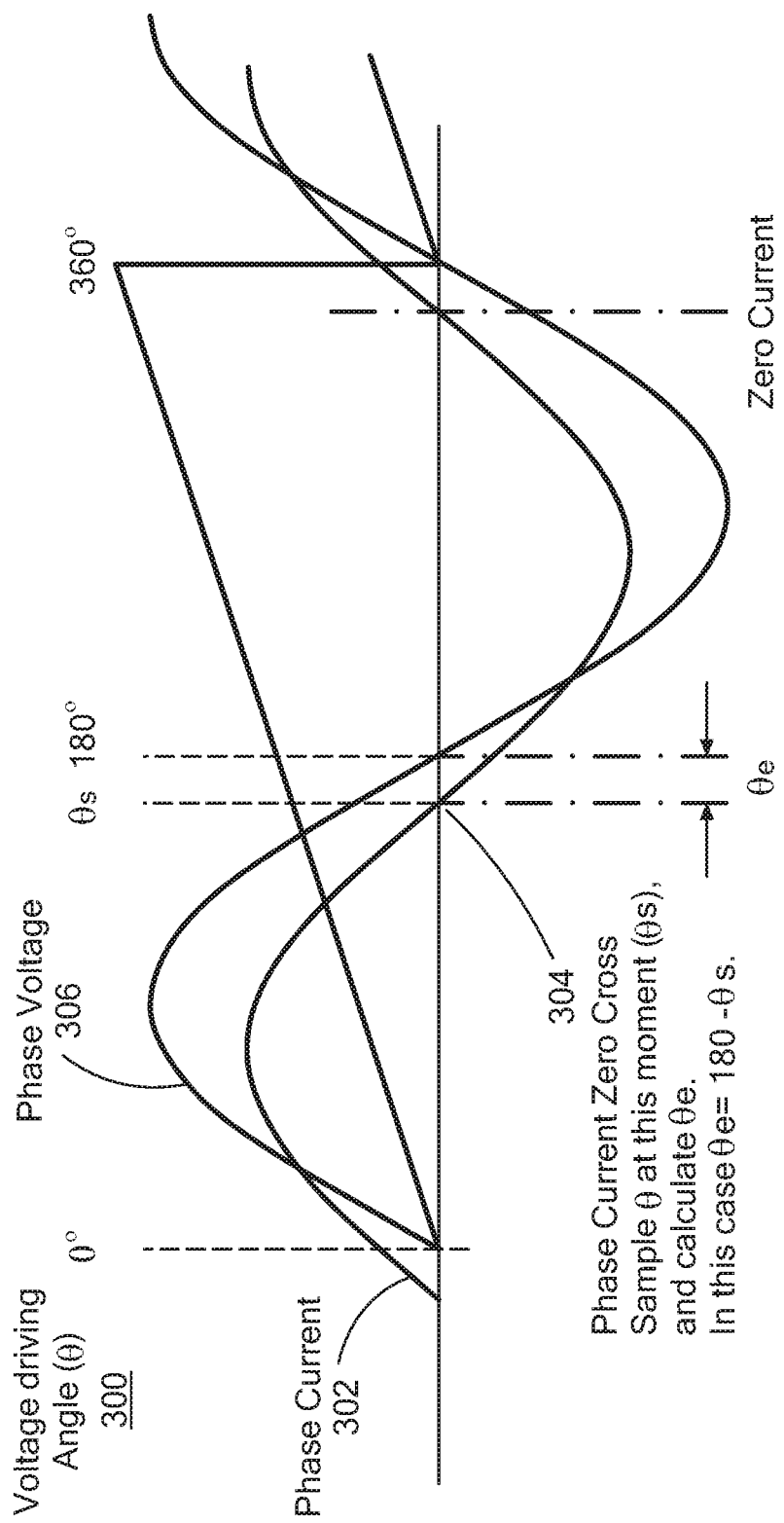
FIG. 3 is graphical representation of illustrative phase current and phase voltage waveforms for a BLDC motor.

FIG. 3 shows illustrative waveforms that can be used for BLDC motor control in accordance with example embodiments of the invention. A voltage driving angle 300 for a three phase BLDC is shown from 0 to 360 degrees. A sinusoidal phase current signal 302 is shown having a falling zero crossing 304 that corresponds to the sampled voltage driving angle θs, which can be used to derive the angle θe between the phase current 302 and a phase voltage 306. In the illustrated embodiment, θe=180−θs.

Figure 3A:
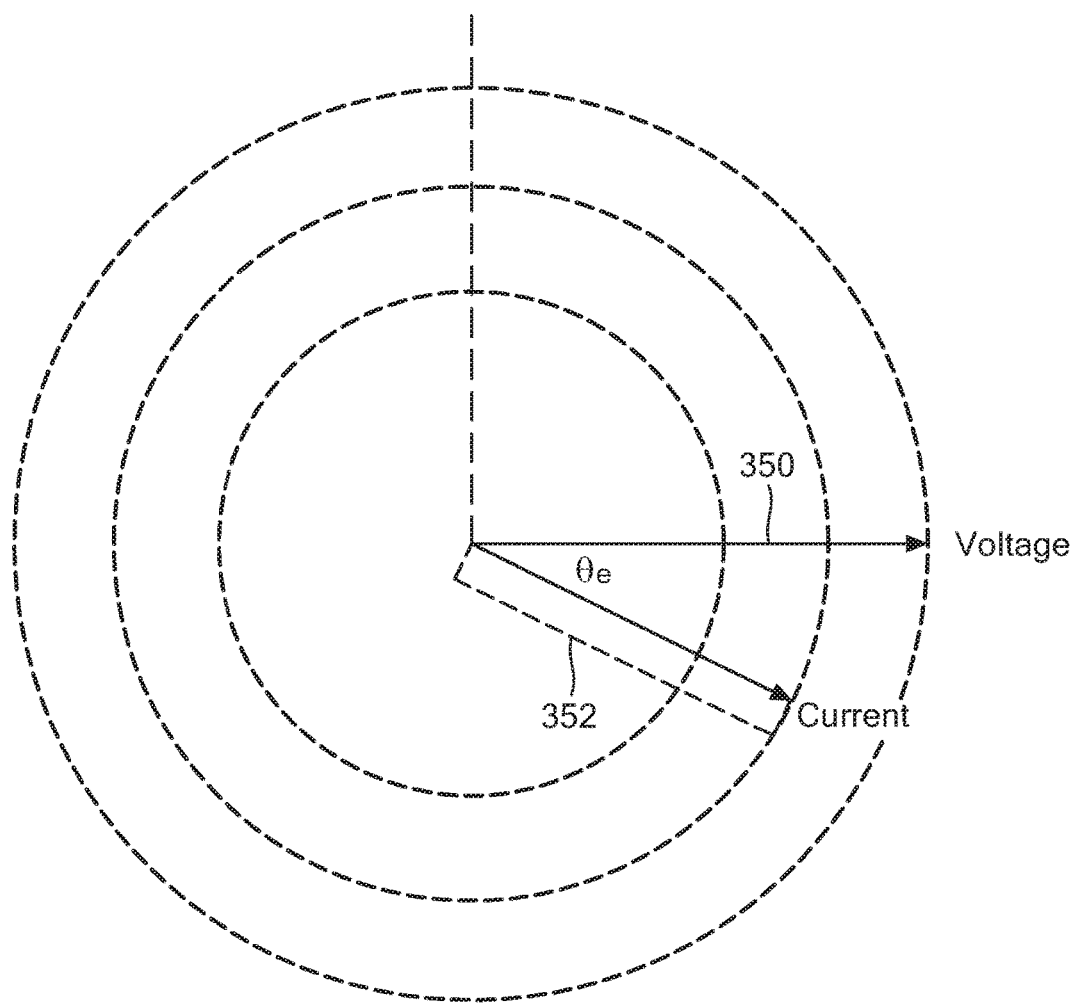
FIG. 3A is a polar coordinate representation of phase voltage and driving current.

In embodiments, difference angle θe should be equal to θ0 (FIG. 2) at steady state conditions. FIG. 3A shows angle θe in a polar coordinate system defined by angle between phase voltage 350 and the driving current 352 (FIG. 2 output from 206).

Figure 4:
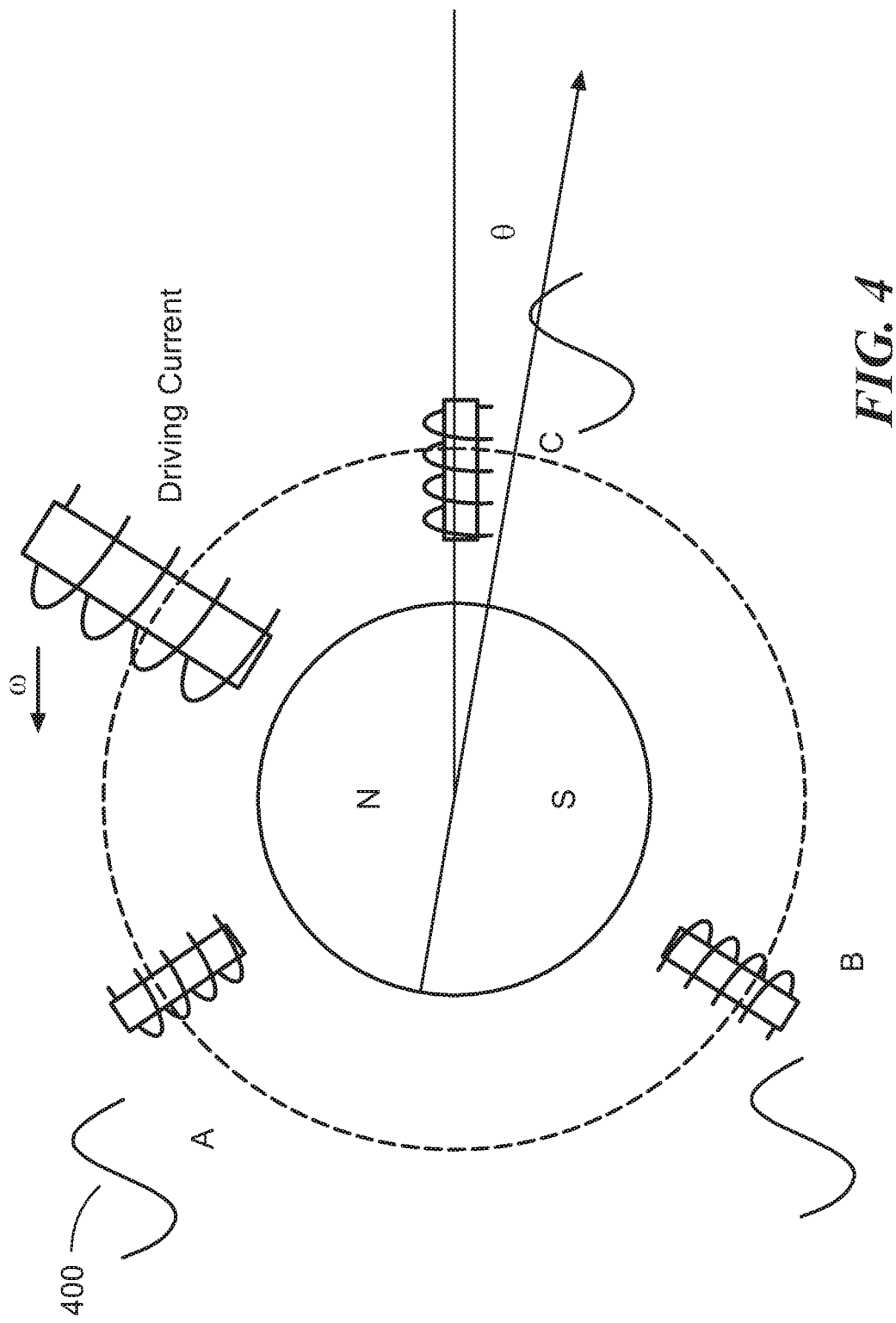
FIG. 4 is a schematic representation of driving current as a rotational DC current derived from three-phase AC currents.

FIG. 4 shows a representation of driving current for which three-phase AC currents can be replaced with an equivalent rotational DC current. As can be see, a sinusoidal current can be supplied to each of phase A, B, C of a motor. A magnet includes a north N pole and a south S pole from which position is determined. Angle θ refers to the voltage driving angle, which is the input of the sinusoidal function of the phase voltage. In embodiments, the angle θ can provide an index of the sinusoidal look up table.

As noted above, the I_bus/command module 206 (FIG. 2) can generate the I_driving signal for the PID controller 216. In example embodiments, the I_driving=I_bus divided by the speed command. The relationship between the I_driving and the phase current is described below:

The three phase currents can be defined as:

$$IA = I\text{peak} * \sin(\omega t), \text{ where } \omega \text{ corresponds to motor speed}$$

$$IB = I\text{peak} * \sin(\omega t - 120°)$$

$$IB = I\text{peak} * \sin(\omega t - 240°),$$

The phase torques can be defined as:

$$TA = IA * \text{FluxPeak} * \sin(\theta + 120°)$$

$$TB = IB * \text{FluxPeak} * \sin(\theta + 240°)$$

$$TC = IC * \text{FluxPeak} * \sin(\theta + 0°)$$

$$T\text{sum} = 1.5 * I\text{peak} * \text{FluxPeak} * (\omega t + \theta + 120°)$$

For a DC driving current Idrive=1.5*Ipeak, which rotates with speed ω counterclockwise, then $$T\text{drive} = 1.5 * I\text{peak} * \text{FluxPeak} * (\omega t + \theta + 120°) = T\text{sum}$$

It can be seen that, by applying Idrive, which is 1.5 times of the Ipeak DC current, rotated together with the magnet of the BLDC, the BLDC motor is driven by the equivalent torque Tdrive=Tsum. So, for analysis, the 3 phase current IA, IB and IC are replaced by Idrive. Idriving is the amplitude of Idrive, and can be measured by the I_bus/command module 206 (FIG. 2)

Figure 5:
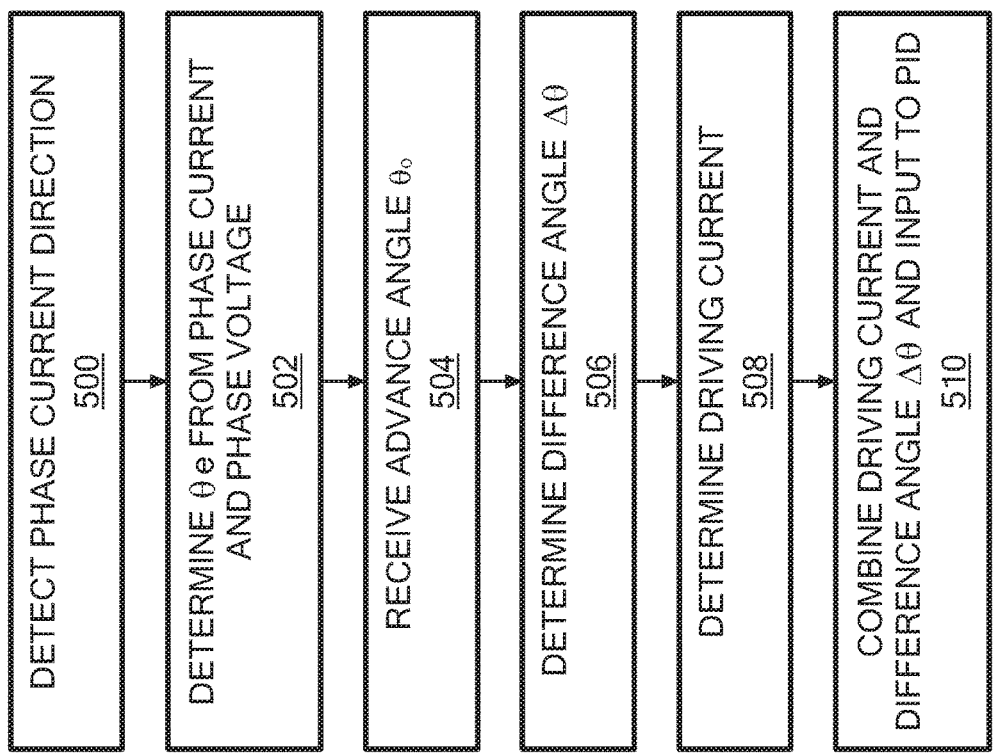
FIG. 5 is an illustrative process for controlling speed of a three-phase BLDC motor in accordance with example embodiments of the invention.

FIG. 5 shows an example process for BLDC motor control in accordance with illustrative embodiments of the invention. In step 500, phase current direction can be detected using a suitable zero current detection (ZCD) technique, such as that shown and described in U.S. Pat. No. 8,917,043, which is incorporated herein by reference. In step 502, an angle θe between phase current 302 (see, e.g., FIG. 3) and phase voltage 306 can be calculated from the sampled voltage driving angle θs when zero current is detected. The voltage driving angle θ can be an index from 0 to 360 degree, which determines the sinusoidal wave output. The angle θe can correspond to the angular position of the current in the polar coordinate system, as shown in FIG. 3A. In step 504, a phase advance angle $\theta_0$ is received as an input, calculated from motor inductance, or the like. In general, the angle θe should be equal to $\theta_0$ at steady state. In step 506, the difference angle Δθ (e.g., θ0−θe) provides a feedback signal to the control loop, e.g., PID controller 216 (FIG. 2) for adjusting motor speed co.

In step 508, the system (e.g., I_bus/command module 206 FIG. 2) measures the average value of the bus current 204 (FIG. 2 and FIG. 4) and converts this value to the driving current (I_driving), which is the effective rotational current that creates the driving torque for the motor. It is understood that any suitable method to measure and/or estimate the driving current can be used. In the three-phase BLDC motor driven by sinusoidal waveform, as noted above, the three phase AC currents can be replaced with an equivalent rotational DC current that can be referred to as the driving current, which is proportional to the bus current divided by the amplitude command. In one embodiment, I_driving=Ibus*1.732/amplitude_command. The driving current is the radial portion 352 in the polar coordinate system of FIG. 3A.

In step 510, the driving current is multiplied by the difference angle Δθ and the product is fed into a PI controller 216 (FIG. 2). The proportional gain (Kp) and the integral gain (Ki) of the PI control loop can be determined by motor parameters, for example. The driving current can also be used for power control which controls the system acceleration and deceleration.

Figure 6:
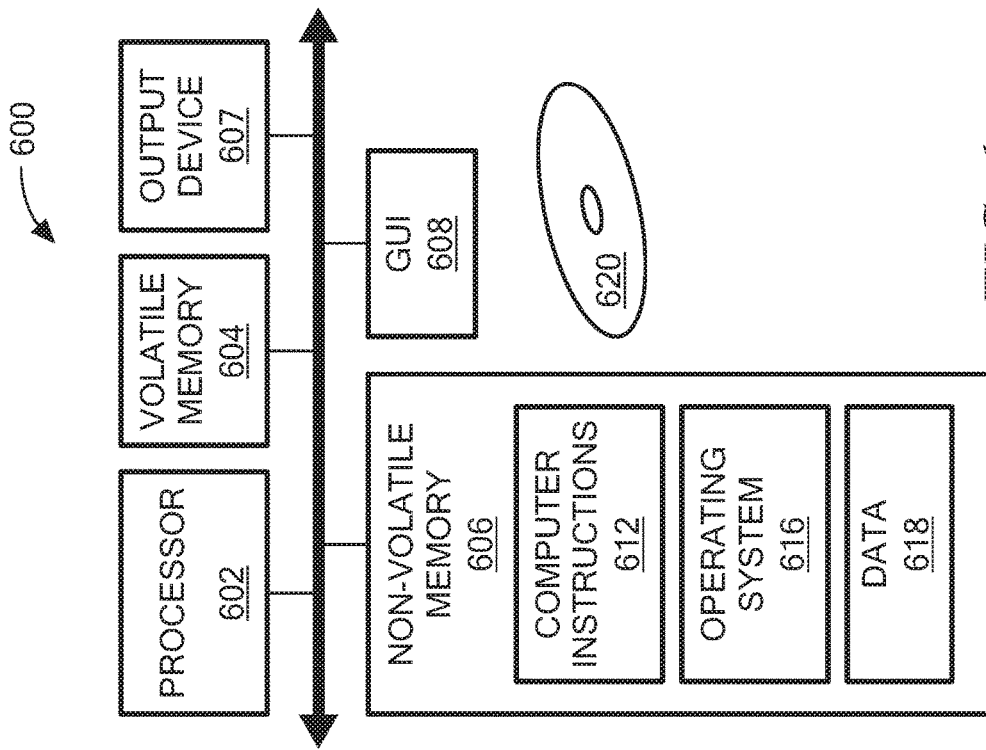
FIG. 6 is an illustrative computer that can perform at least a portion of the processing described herein.

FIG. 6 shows an exemplary computer 600 that can perform at least part of the processing described herein. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method of controlling a three-phase BLDC motor, comprising:
   receiving phase current signals for the BLDC motor;
   determining a first angular difference between a phase current and a phase voltage of the BLDC motor, the difference between the phase current and the phase voltage of the BLDC motor being determined based on a voltage driving angle corresponding to zero current detection for the phase current signals, the voltage driving angle corresponding to a range of zero to three-hundred sixty degrees;
   determining a second angular difference between an advance angle and the first angular difference;
   determining a driving current derived from a bus current of the BLDC motor;
   combining the second angular difference and the driving current to generate an output; and
   feeding the output to a control loop for controlling speed of the BLDC motor.

2. The method according to claim 1, further including generating the voltage driving angle by using a proportional-integral-derivative (PID) controller that is part of the control loop.

3. The method according to claim 1, wherein the voltage driving angle corresponds to a position relative to a rotor magnet having a north N pole and a south S pole.

4. The method according to claim 1, wherein the voltage driving angle corresponds to an input of a sinusoidal function of the phase voltage.

5. The method according to claim 1, wherein the advance angle is provided as an input signal.

6. The method according to claim 1, further including determining the driving current from an average bus current.

7. The method according to claim 1, wherein the driving current is proportional to a bus current divided by an amplitude command.

8. The method according to claim 1, further including employing a proportional-integral-derivative (PID) controller as part of the control loop and using an output of the PID controller as a lookup to adjust motor speed.

9. The method according to claim 8, further including combining the lookup, an amplitude command, and a voltage to control motor speed.

10. A system to control a three-phase BLDC motor, comprising:
    a first module to receive phase current signals for the BLDC motor and output three-phase current direction information;
    a second module to determine a first angular difference between a phase current and a phase voltage of the BLDC motor, the difference between the phase current and the phase voltage of the BLDC motor being determined based on a voltage driving angle corresponding to zero current detection for the three-phase current direction information, the voltage driving angle corresponding to a range of zero to three-hundred sixty degrees;
    a third module to determine a second angular difference between an advance angle and the first angular difference;
    a fourth module to determine a driving current derived from a bus current of the BLDC motor;
    a combiner to combine the second angular difference and the driving current to generate an output; and
    a control loop module having a computer processor to receive the output of the combiner for controlling speed of the BLDC motor.

11. The system according to claim 10, wherein the system comprises an IC package having first, second, and third outputs for proving outputs to each of the three phases.

12. The system according to claim 10, wherein the control loop module comprises a proportional-integral-derivative (PID) controller that is configured to generate the voltage angle.

13. The system according to claim 10, wherein the voltage driving angle corresponds to a position relative to a rotor magnet having a north N pole and a south S pole.

14. The system according to claim 10, wherein the advance angle is provided as an input signal.

15. The system according to claim 10, further including a bus current module configured to determine the driving current from an average bus current.

16. The system according to claim 15, wherein the driving current is proportional to a bus current divided by an amplitude command.

17. The system according to claim 10, further including first, second, and third pairs of switching elements for generating the outputs to each of the three phases of the motor.

18. The system according to claim 17, further including a gate driver module to receive pulse-width modulated (PWM) signals and generate the outputs to each of the three phases of the BLDC motor.

19. The system according to claim 10, wherein the system comprises an IC package having first, second, and third pins for providing outputs to each of the three phases and a fourth pin to receive a speed demand signal.

* * * * *